US012603547B2

(12) United States Patent     (10) Patent No.:   US 12,603,547 B2

Talayer et al.             (45) Date of Patent:     Apr. 14, 2026

(54) AXIAL ALIGNMENT SYSTEM FOR A ROTOR OF A ROTARY ELECTRIC MACHINE, AND CORRESPONDING ROTARY ELECTRIC MACHINES

(71) Applicant: WEG EQUIPAMENTOS ELÉTRICOS S.A., Jaraguá do Sul (BR)

(72) Inventors: Everton Soares Talayer, Jaraguá do Sul (BR); Henrique Scremin Weber, Jaraguá do Sul (BR); Jose Luis De Souza, Jaraguá do Sul (BR); Solon Brum Silveira, Jaraguá do Sul (BR)

(73) Assignee: WEG EQUIPAMENTOS ELÉTRICOS S.A., Jaraguá Do Sul (BR)

( * ) Notice: Subject to any disclaimer, the term of this patent is extended or adjusted under 35 U.S.C. 154(b) by 121 days.

(21) Appl. No.: 18/568,356

(22) PCT Filed: Jun. 17, 2021

(86) PCT No.: PCT/BR2021/050265

§ 371 (c)(1),
(2) Date: Dec. 8, 2023

(87) PCT Pub. No.: WO2022/261733

PCT Pub. Date: Dec. 22, 2022

(65) Prior Publication Data

US 2024/0275238 A1     Aug. 15, 2024

(51) Int. Cl.
*H02K 7/09*       (2006.01)
*F16C 39/06*      (2006.01)

(52) U.S. Cl.
CPC ............. *H02K 7/09* (2013.01); *F16C 39/066* (2013.01); *F16C 2380/26* (2013.01)

(58) Field of Classification Search
CPC ............................. H02K 7/09; H02K 2205/03
See application file for complete search history.

(56) References Cited

U.S. PATENT DOCUMENTS

| | | | | |
|---|---|---|---|---|
| 2,747,944 | A | * | 5/1956 | Baermann ............. G01R 11/14 |
| | | | | 416/174 |
| 5,126,610 | A | | 6/1992 | Fremerey |
| 5,894,181 | A | * | 4/1999 | Imlach ................ F16C 32/0429 |
| | | | | 310/90.5 |
| 6,118,199 | A | * | 9/2000 | Lembke .............. F16C 32/0436 |
| | | | | 310/90.5 |

(Continued)

FOREIGN PATENT DOCUMENTS

| | | | |
|---|---|---|---|
| CN | 1301583 C | 2/2001 | |
| CN | 112412980 A | * 2/2021 | .......... F16C 32/0425 |
| WO | WO-2019/245226 A1 | 12/2019 | |

OTHER PUBLICATIONS

CN-112412980-A Machine Translation (Year: 2021).*

(Continued)

*Primary Examiner* — Oluseye Iwarere
*Assistant Examiner* — Masoud Vaziri
(74) *Attorney, Agent, or Firm* — Foley & Lardner LLP

(57) ABSTRACT

An axial alignment system for a rotary electric machine rotor includes: at least one first fixing ring; at least one first permanent magnet ring; at least one second fixing ring; and at least one second permanent magnet ring.

14 Claims, 8 Drawing Sheets

(56) References Cited

U.S. PATENT DOCUMENTS

| | | | |
|---|---|---|---|
| 6,448,679 | B1 | 9/2002 | Imlach |
| 6,588,554 | B2 | 7/2003 | Fujita et al. |
| 6,806,605 | B1 * | 10/2004 | Gabrys .................... H02K 7/09 |
| | | | 310/90 |
| 2005/0140228 | A1 * | 6/2005 | Yeh ..................... F16C 32/0425 |
| | | | 310/90.5 |
| 2008/0143205 | A1 * | 6/2008 | Pulnikov .................. H02K 7/09 |
| | | | 384/114 |
| 2008/0174119 | A1 * | 7/2008 | Hu ........................ F16C 39/066 |
| | | | 290/55 |
| 2011/0001379 | A1 * | 1/2011 | McCarthy ........... F16C 32/0425 |
| | | | 310/90.5 |
| 2021/0054897 | A1 | 2/2021 | Bird |

OTHER PUBLICATIONS

International Search Report with English language translation and Written Opinion of the International Searching Authority issued in the corresponding International Patent Application No. PCT/BR2021/050265, dated Mar. 15, 2022.

* cited by examiner

A(1:4)

AXIAL ALIGNMENT SYSTEM FOR A ROTOR OF A ROTARY ELECTRIC MACHINE, AND CORRESPONDING ROTARY ELECTRIC MACHINES

FIELD OF APPLICATION

The present invention pertains to the field of rotary electric machines, in particular rotary electric machines having a rotary element that supports sliding bearings, notably magnetic devices for axial alignment of the rotary element in relation to the non-rotary element.

BACKGROUND OF THE INVENTION

Rotary electric machines are equipment used for transforming electric energy into mechanical energy, in the case of motors, and for transforming mechanical energy into electric energy, in the case of generators. They are essentially composed of four basic structures, which are the housing, stator, rotor, and bearings/caps.

The housing is the element responsible for integrating such structures.

The stator is the static active (energized) component responsible for transmitting the magnetic flux for rotary the rotor, in the case of motors, and for transmitting the energy generated by the rotor, in the case of generators, whereas the rotor is the active (energized) component of the rotary electric machine.

The rotor, in turn, is basically composed of a axis onto which one or more cages or coils are arranged, depending on the construction type and operating principle of the rotary electric machine, whereby cooling and/or ventilation elements, such as fans, fins and the like, may be fixed in one or both ends of the axis.

The bearings are the elements responsible for coupling the rotary parts to the static parts of a rotary electric machine, performing, for example, the coupling, bearing, and centralization of the (rotary) rotor in relation to the (static) stator, allowing for relative movement between rotor and stator, as well as transmitting forces therebetween.

It should be noted that, in the context of the present invention, the term bearing encompasses elements capable of coupling and/or supporting and/or centralizing, comprising hydrostatic and hydrodynamic sliding bearings, with permanent or continuous lubrication, used alone or in combination therebetween, whereby lubrication is possible via a lubricating circuit and other forms of lubrication known in the art.

Rotary electric machines operate under a myriad of different rotation, mechanical load, and temperature conditions, and in the case of machines provided with sliding bearings, the rotor must maintain its axial translational stability in any operating condition, i.e., it must always be centered in relation to the axial travel allowed by the bearings.

Since the rotor of a rotary electric machine is subject, to a greater or lesser extent depending on rotation and construction type, to the thrust generated by the ventilation systems arranged in the rotor, and to the greater or lesser intensity of the axial magnetic force arising from the misalignment between the rotor and the stator, at different rotation regimes and temperature variations (of operation and environment), the problem consists precisely in keeping the rotor axially stabilized (centralized) in most of said conditions, implying challenges in component design, manufacture, assembly, and adjustment.

STATE OF THE ART

In the state of the art there are several solutions aimed at optimizing the bearing and axial positioning of the rotor in relation to the stator of rotary electric machines.

An example is patent document WO2019/245226 A1 which discloses and describes a magnetic thrust bearing using flux switching, in which a magnetic thrust bearing is mounted on one side of a rotor having an rotation shaft formed in one direction to control the axial oscillations of the rotor by levitating a disc-shaped rotor collar which is coupled to the rotor in the direction perpendicular to the rotation shaft, and comprises a ring-shaped permanent magnet inserted and fixed in the rotor collar, an electromagnetic coil provided to be spaced from the permanent magnet by a predetermined distance, and a stator core for covering the electromagnetic coil. Accordingly, the magnetic thrust bearing can be flux-switched to form a magnetic flux of the magnetic bearing in one direction only, and can ensure approximately twice the thrust force compared to the same volume of the existing thrust magnetic bearing.

This solution replaces rolling and sliding bearings with magnetic bearings, making axial displacement compensation through magnetic fields from coils, making it a solution that takes up a significant amount of space and incurs high costs due to the number of components.

As can be seen from the description above, there is space and demand for a solution of axially aligning rotors of rotary electric machines which is modular, versatile, simple in construction, manufacturing, and installation, and that overcomes the disadvantages of the prior art, in particular which increases the reliability of axial alignment in the greatest possible number of conditions and application situations, while also reducing manufacturing time, material, and costs.

OBJECTS OF THE INVENTION

One of the objects of the present invention is therefore to provide an axial alignment system for a rotary electric machine rotor, as per the features of claim 1 of the appended set of claims.

Another object of the present invention is to provide a rotary electric machine provided with an axial alignment system for a rotary electric machine rotor, as per the features of claim 7 of the appended set of claims.

Yet another the object of the present invention is to provide an axial alignment system for a rotary electric machine rotor, as per the features of claim 8 of the appended set of claims.

Yet another object of the present invention is to provide a rotary electric machine provided with an axial alignment system for a rotary electric machine rotor, as per the features of claim 15 of the appended set of claims.

Additional features and details thereof are presented in the dependent claims.

BRIEF DESCRIPTION OF THE DRAWINGS

For a better understanding and visualization of the object to which the invention relates, the present invention will now be described with reference to the accompanying figures, representing the obtained technical effect by means of an exemplary embodiment without limiting the scope of the present invention, wherein, schematically.

DETAILED DESCRIPTION OF THE INVENTION

Figure 1:
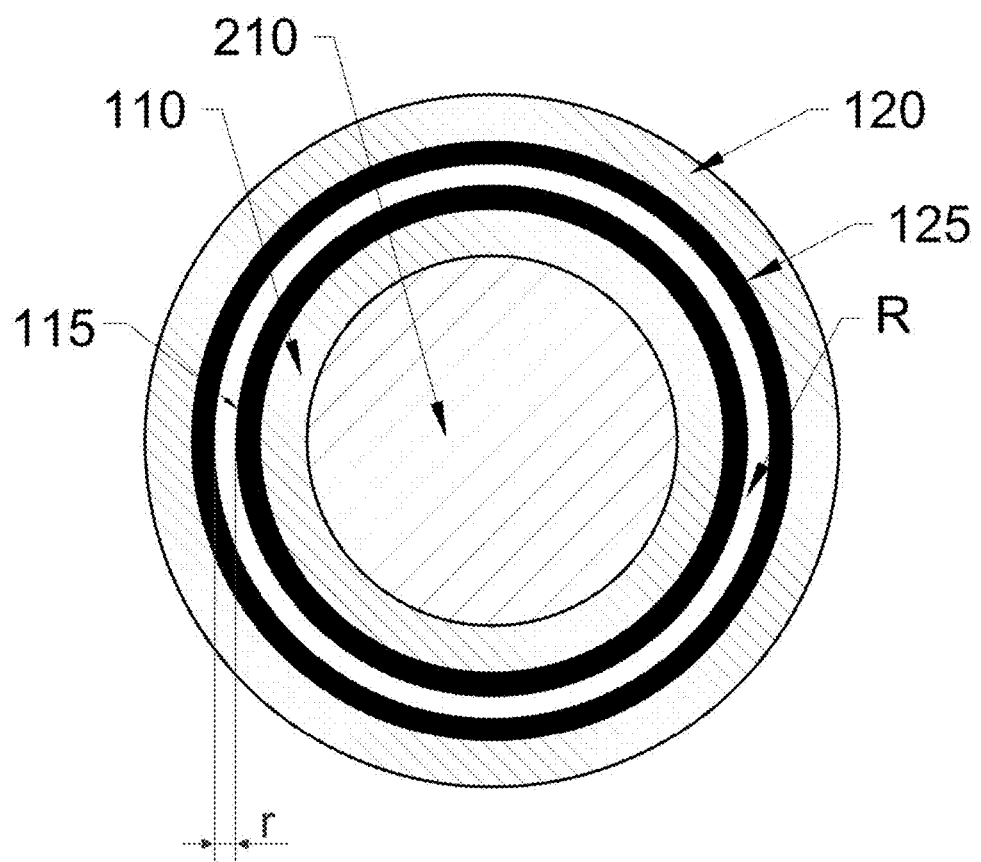
FIG. 1 shows a partial cross-section front view of an electric machine rotor provided with a system according to the invention.
Figures 2, 2A:
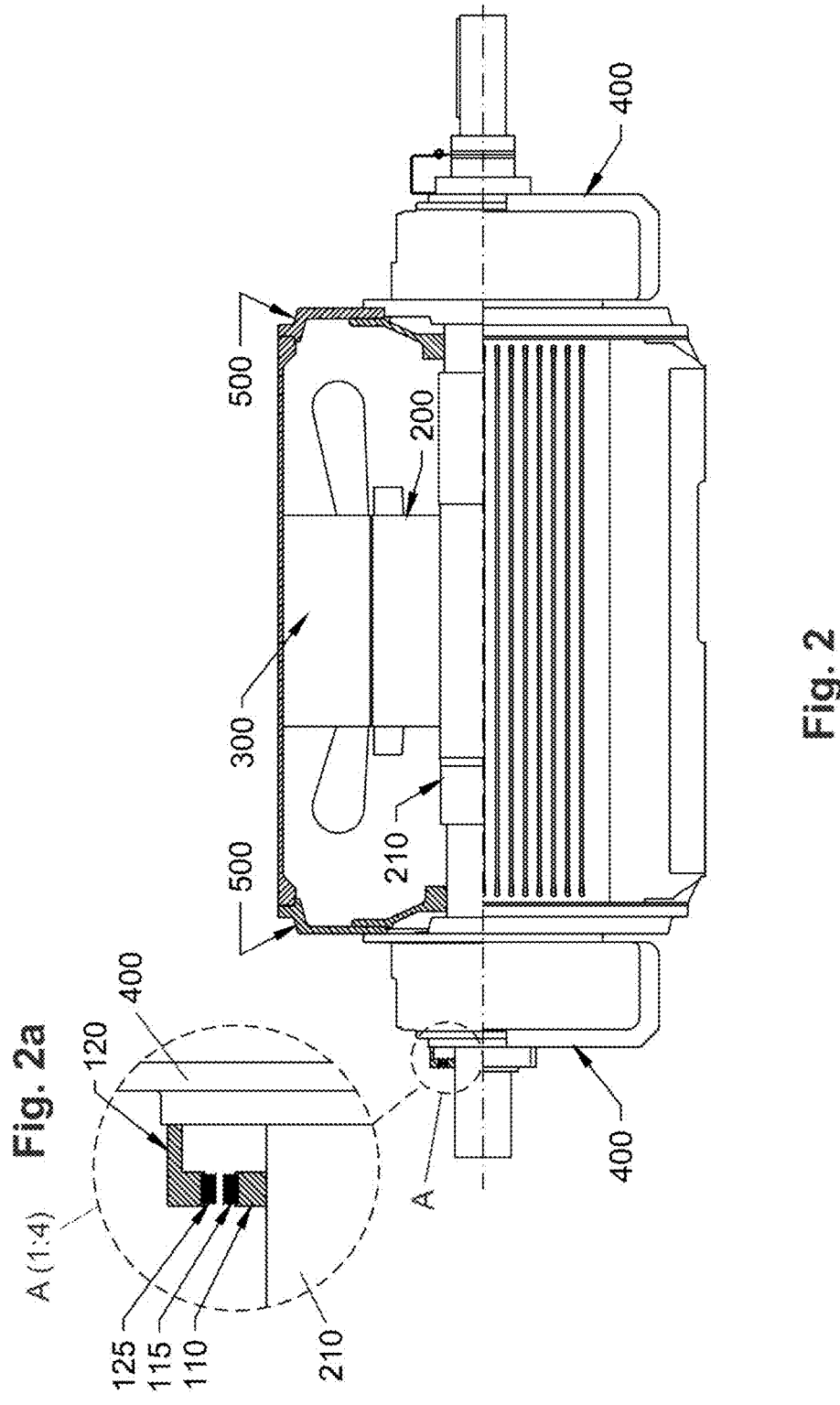
FIG. 2 shows a side view in partial section of a rotary electric machine provided with a system according to the invention, arranged externally to the rotary electric machine.
FIG. 2*a* shows an enlarged view of detail A of FIG. 2.
Figure 2B:
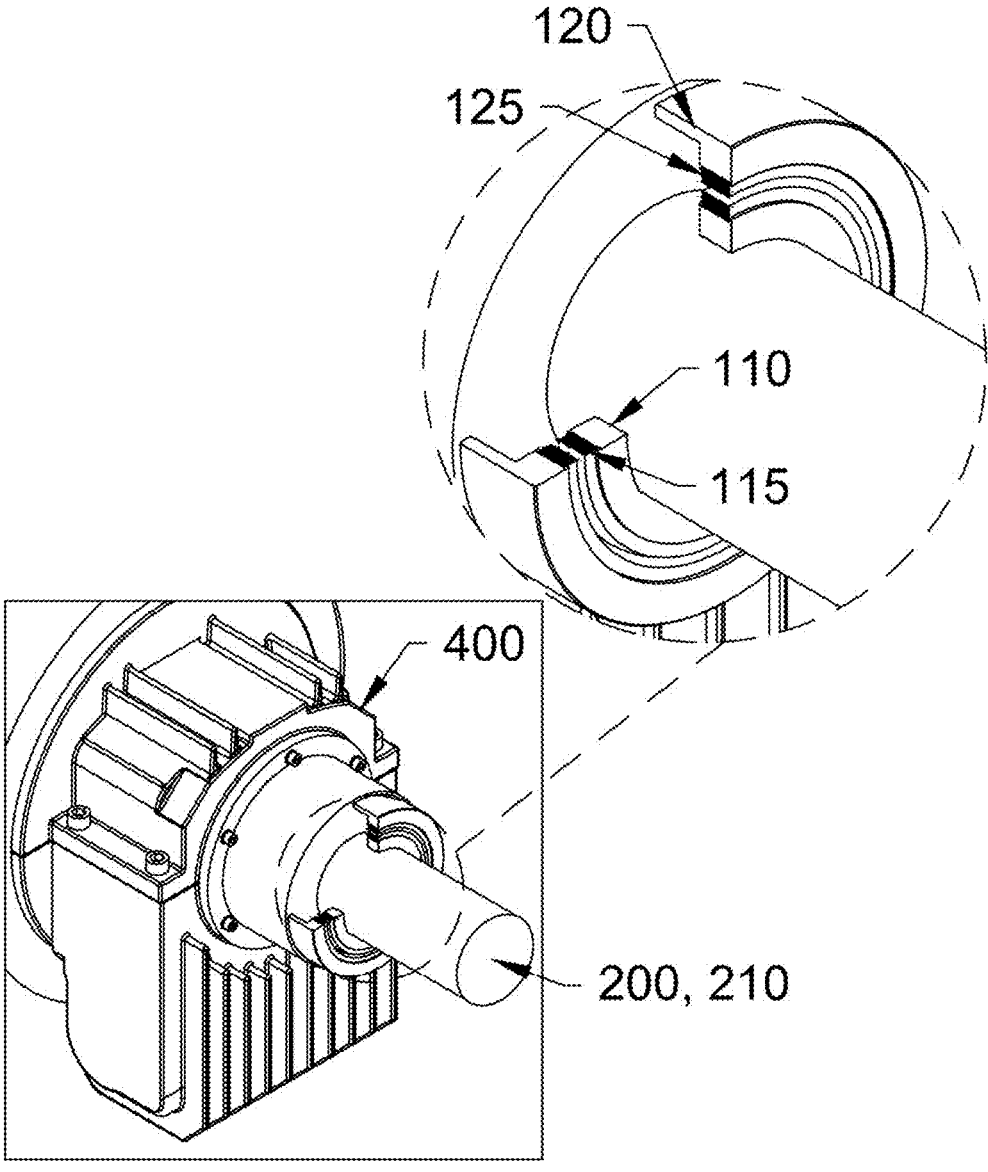
FIG. 2*b* shows a perspective view of a partial cross-section of the rotary electric machine in FIG. 2, with an enlarged detail of the system arranged externally to the rotary electric machine.
Figures 3, 3A:
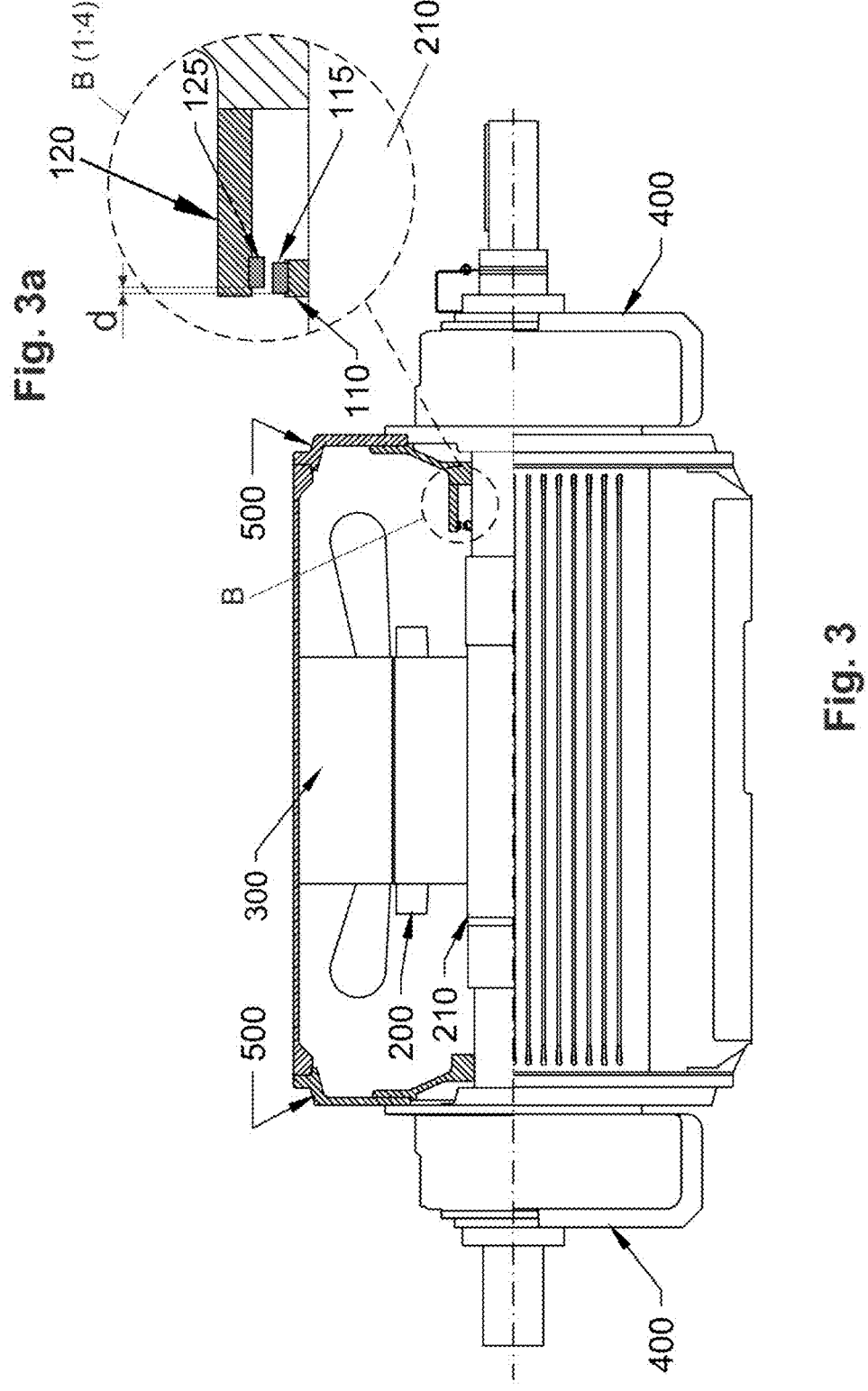
FIG. 3 shows a side view in partial cross-section of a rotary electric machine provided with a system according to the invention, arranged internally to the rotary electric machine and with the first rings surrounded by the second rings.
FIG. 3*a* shows an enlarged side view of detail B in FIG. 3.

The present invention relates to an axial alignment system (100), or simply system (100), for application in rotary electric machines provided with a rotor (200), stator (300), bearings (400), and caps or seals (500).

In one preferred embodiment of the invention, the system (100) comprises:

i. at least one first fixing ring (110);

ii. at least one first permanent magnet ring (115);

iii. at least one second fixing ring (120); and iv. at least one second permanent magnet ring (125).

The first fixing ring (110) is concentric to the axis (210) of the rotor (200) and fixed thereto by means of fixing elements, being therefore integral with the axis (210) and rotating along therewith at the same angular speed, without slipping. The internal diameter of the first fixing ring (110) must be at least equal to the external diameter of the axis (210) of the rotor (200). The first fixing ring (110) is manufactured from a material suitable for the application and may be, without limitation, metal and alloys thereof or polymeric material, alone or in combination. The first fixing ring (110) may be fixed to the rotor (200) in an internal (FIGS. 3, 3*a*, 4, 4*a*, 4*b*) and/or external (FIGS. 2, 2*a*, 2*b*, 5, 5*a*, 5*b*) portion of the rotary electric machine.

The first permanent magnet ring (115) is concentric to the first fixing ring (110) and therefore to the axis (210) of the rotor (200), and fixed on its outer perimeter by means of fixing elements, and is therefore integral with the first fixing ring (110) and thus also integral with the shaft (210), rotating therewith at the same angular speed, without slipping. The inner diameter of the first permanent magnet ring (115) must be at least equal to the outer diameter of the first fixing ring (110). The first permanent magnet ring (115) is manufactured from magnetizable material, which may be, without limitation, ferromagnetic metal and alloys thereof, alone or in combination, and may be constructed in a single piece or in segments. The term fixing elements, in the context of the invention, relates to fixing elements and means known in the state of the art and suitable for the application, which may be, without limitation, welding, screw, bolt and nut, wedge, key, adhesive, thermal contraction, pressing and the like. The first permanent magnet ring (115), due to being integral with the first fixing ring (110), may also be in an internal (FIGS. 3, 3*a*, 4, 4*a*, 4*b*) and/or external (FIGS. 2, 2*a*, 2*b*, 5, 5*a*, 5*b*) portion of the rotary electric machine.

The second fixing ring (120) is concentric to the axis (210) of the rotor (200) and fixed to an internal (FIGS. 3, 3*a*, 4, 4*a*, 4*b*) and/or external (FIGS. 2, 2*a*, 2*b*, 5, 5*a*, 5*b*) portion of one or more static elements of the rotary electric machine, by means of fixing elements, being therefore integral with the static part of the electric machine and thus immobile. The second fixing ring (120) is manufactured from a material suitable for the application and may be, without limitation, metal and alloys thereof or polymeric material, alone or in combination.

The second permanent magnet ring (125) is concentric to the second fixing ring (120) and therefore to the axis (210) of the rotor (200), and fixed on its internal perimeter by means of fixing elements, and is therefore integral with the second fixing ring (120) and thus also integral with an internal (FIGS. 3, 3*a*, 4, 4*a*, 4*b*) and/or external (FIGS. 2, 2*a*, 2*b*, 5, 5*a*, 5*b*) portion of one or more static elements of the rotary machine electric and thus immobile. The internal diameter of the second permanent magnet ring (125) is larger than the external diameter of the first permanent magnet ring (115), whereby they are concentric and separated from each other by a radial spacing (r). The second permanent magnet ring (125) is manufactured from magnetizable material, which may be, without limitation, ferromagnetic metal and alloys thereof, alone or in combination, and may be constructed in a single piece or in segments.

The outer surface of the first permanent magnet ring (115) is arranged opposite the inner surface of the second permanent magnet ring (125), and the permanent magnet rings (115, 125), especially on their surfaces, must have distinct polarities therebetween, so that a magnetic attraction force of opposite poles is established therebetween, taking place in the annular chamber (R) resulting from the radial spacing (r).

Figure 6:
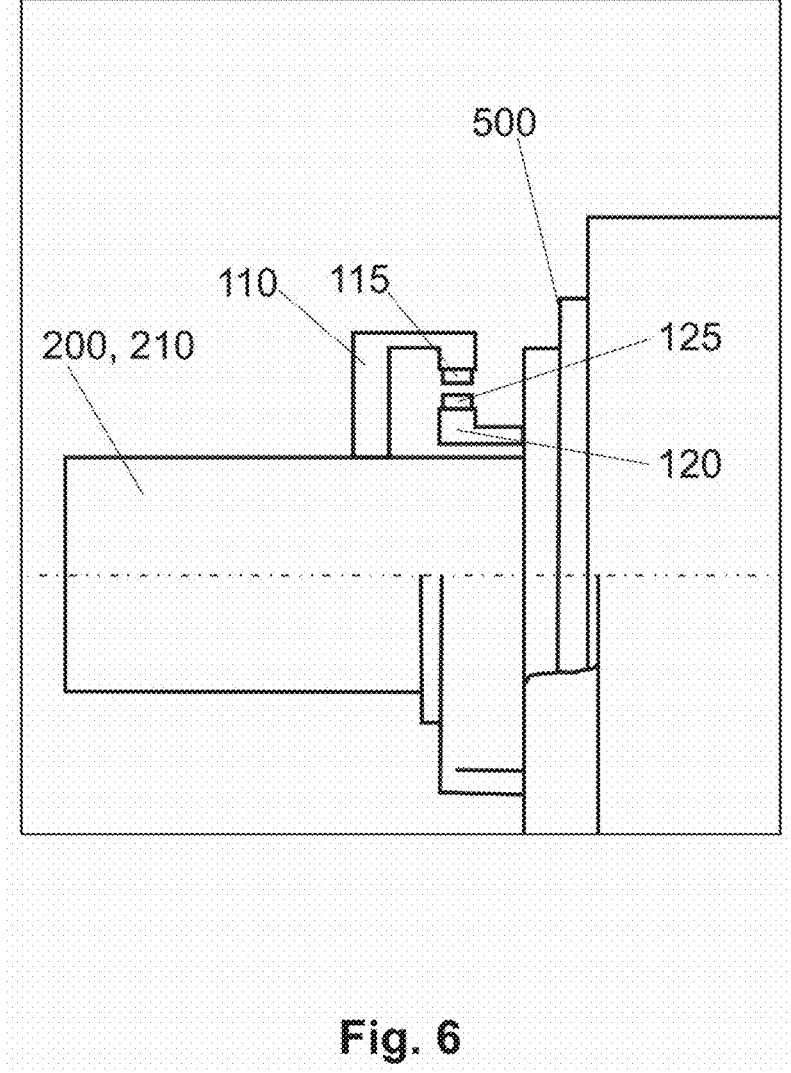
FIG. 6 shows a side view in partial section of a rotary electric machine provided with a system according to the invention, in which the first rings surround the second rings.

Although the preferred composition comprises arranging the first rings (110, 115) inside or surrounded by the second rings (120, 125), the first rings (110, 115) may also be constructed outside or surrounding the second rings (120, 125), which is especially shown in FIG. 6, and the set of rings (110, 115, 120, 125) may also be arranged in an internal and/or external portion of the rotary electric machine.

Furthermore, it should be noted that the use of the term "integral" must be understood broadly and independently of the referenced numbering, and the first rings (110, 115) may be, for example, those integral with a static part of the rotary electric machine, whilst the second rings (120, 125) are the ones which rotate.

It should be noted that the polarity of the first permanent magnet ring (115) must be unique and constant on at least its entire surface facing the surface of the second permanent magnet ring (125). Likewise, the polarity of the second permanent magnet ring (125), different from the polarity of the first permanent magnet ring (115), must be unique and constant over at least its entire surface facing the surface of the first permanent magnet ring (115). It should be noted that the permanent magnet rings (115, 125) may be one piece or composed of several segments.

Thus, the use of at least two permanent magnet rings (115, 125) with different diameters and concentric with each other, and with at least their surfaces having opposite polarities, promotes attraction between the permanent magnet rings (115, 125), forcing magnetic alignment therebetween in the axial direction. Axial displacements (d) between the permanent magnet rings (115, 125) generate magnetic forces which absorb thrust and other axial forces from ventilation systems and/or axial loads, forcing the axis (210) to return to an ideal, initial, or preferred axial translational stabilization position, in which the axial displacement (d) is equal to zero or near zero. Any axial displacements (d) caused by axial forces imposed onto the rotor (200) then occur around this ideal, initial, or preferred axial translational stabilization position.

The system (100) of the invention therefore guarantees the axial alignment of the rotor (200) in relation to the stator (300) and other fixed elements of the electric machine, around an ideal, initial, or preferred axial translational stabilization position in which the numerical value of axial displacement (d) is equal to zero or near zero. The term "near zero" should be understood as being as close to zero as possible or as being the smallest possible value of axial displacement (d).

Figures 4, 4A:
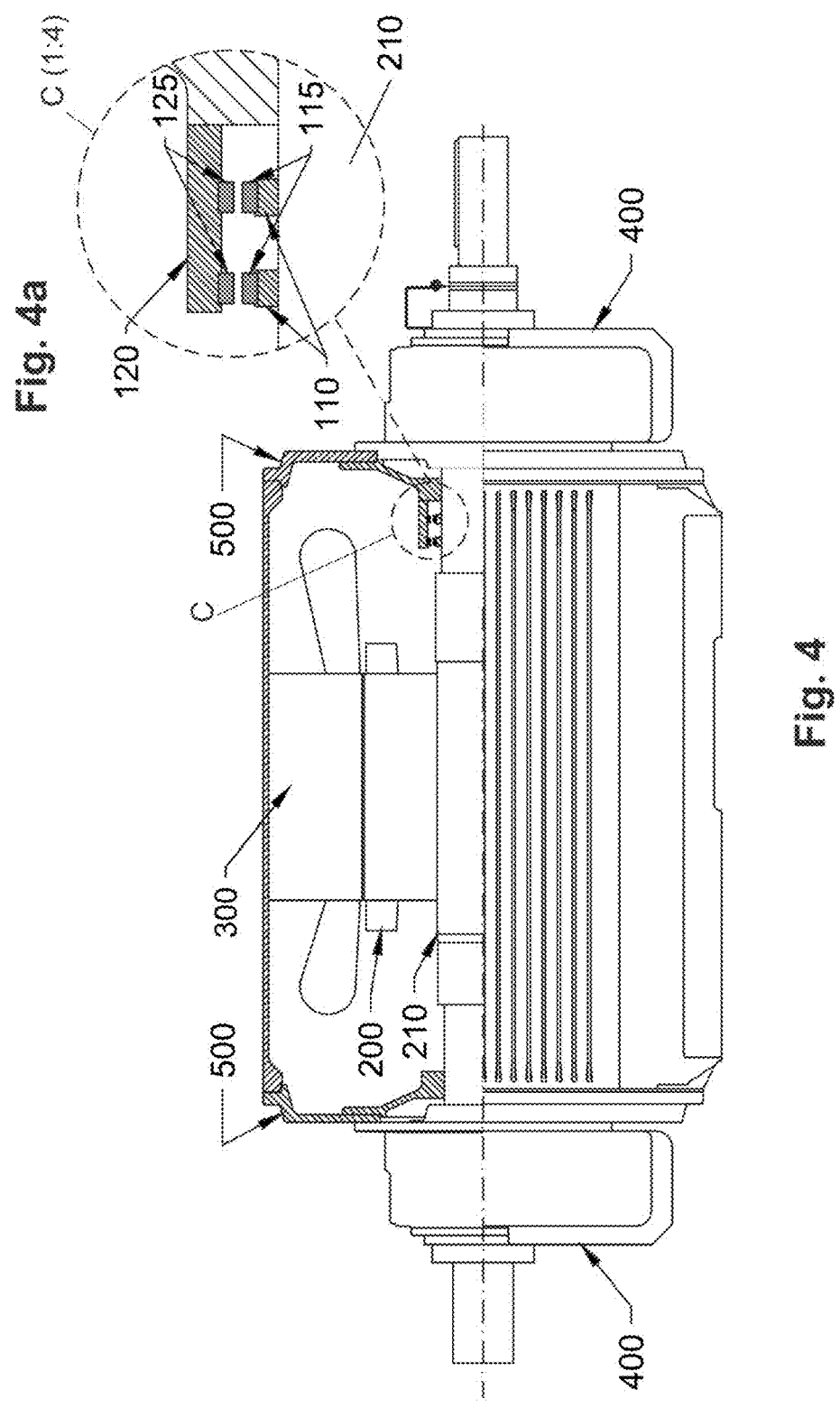
FIG. 4 shows a side view in partial cross-section of the rotary electric machine of FIG. 3, provided with two systems according to the invention arranged internally to the rotary electric machine.
FIG. 4*a* shows an enlarged side view of detail C of FIG. 4.
Figure 4B:
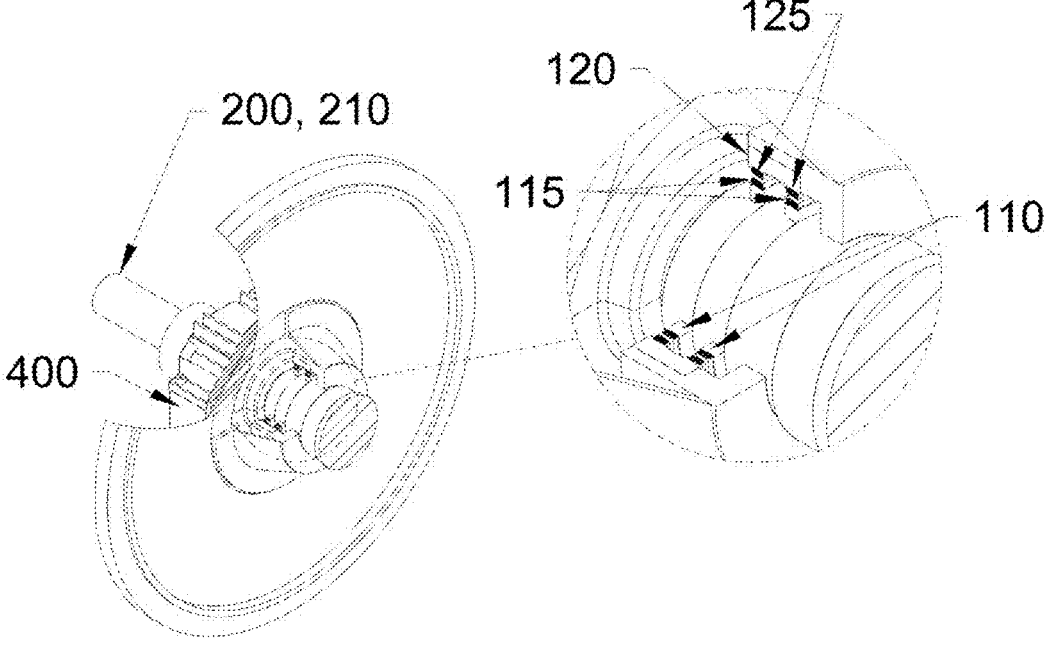
FIG. 4*b* shows a perspective view of a partial cross-section of the rotary electric machine in FIG. 4, with an enlarged detail of the system arranged internally to the rotary electric machine.

By comprising first rings (110, 115) and second rings (120, 125) which consist of separate and independent modules, provided with permanent magnets instead of coils or windings, the system (100) of the invention may be applied to practically any rotary electric machine, which can be internally or externally installed to the rotary electric machine, in simple (internal or external) or mixed (internal and external) mode on the same electric machine, with more than one set of rings (110, 115, 120, 125) installed on the same rotary electric machine, e.g., as represented in FIGS. 4, 4a, and 4b. Likewise, the same rotary electric machine may have an externally installed set of rings (110, 115, 120, 125) and another internally installed set of rings (110, 115, 120, 125) and/or more than one externally installed set of rings (110, 115, 120, 125) and/or more than one internally installed set of rings (110, 115, 120, 125) or combinations of said alternatives. It is also possible to have one or more sets of rings (110, 115, 120, 125) in neighboring positions and/or in non-neighboring positions of the rotary electric machine, in any position of the axis (210) of the rotor (200).

Despite enabling lower attraction or repulsion forces than those obtainable with the solution proposed thus far, it is also possible to use only one set of first rings (110, 115) or only one set of second rings (120, 125), in which the respective opposite part is made of ferromagnetic and unmagnetized material.

Figures 5, 5A, 5B:
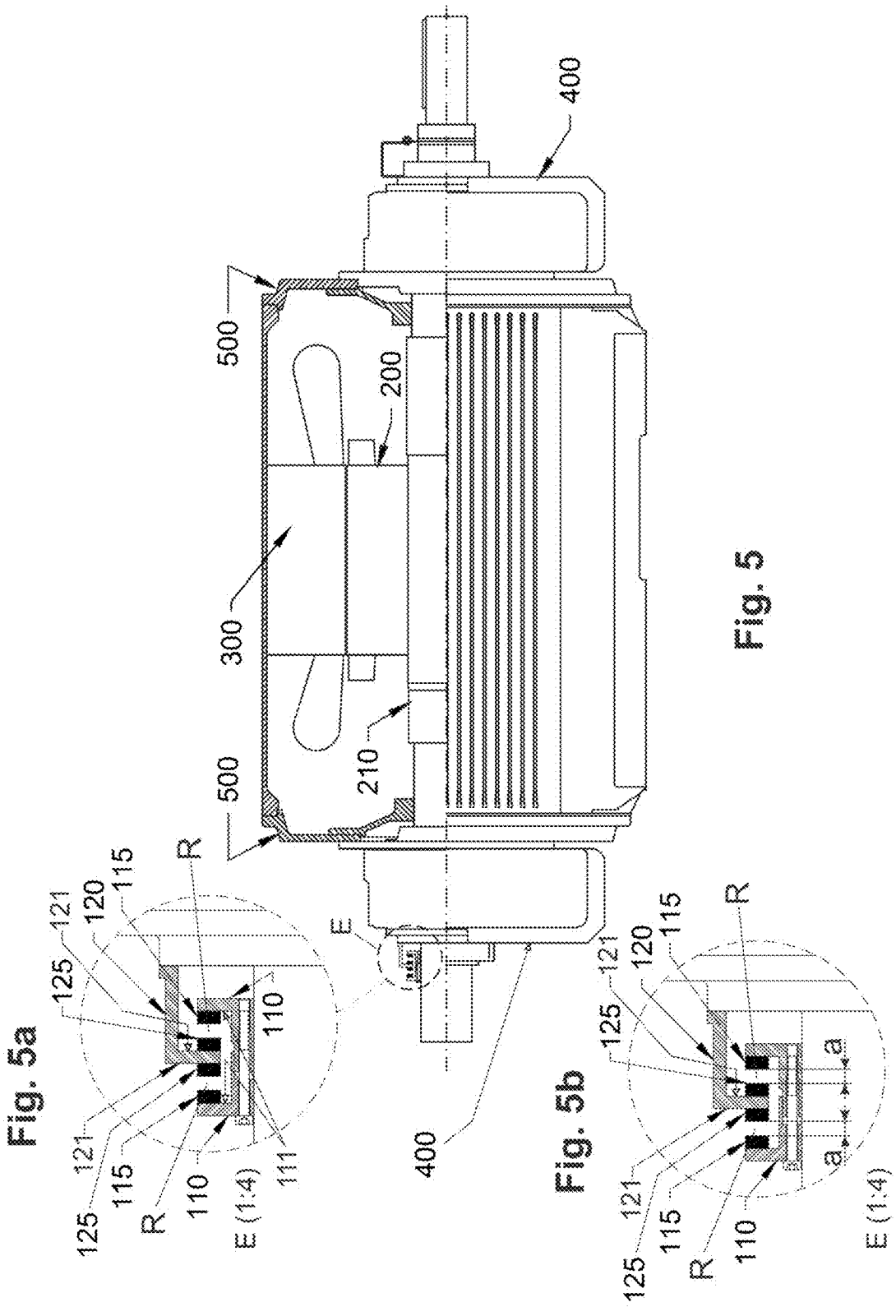
FIG. 5 shows a side view in partial section of a rotary electric machine provided with a system according to another embodiment of the invention, arranged externally to the rotary electric machine.
FIG. 5*a* shows an enlarged side view of detail E of FIG. 5.
FIG. 5*b* shows an enlarged side view of detail E of FIG. 5.

In another non-limiting embodiment of the present invention, especially represented in FIGS. 5, 5a, and 5b, the system (100) of the invention comprises:

i. at least two first fixing rings (110);

ii. at least two first permanent magnet rings (115);

iii. at least one second fixing ring (120); and iv. at least two second permanent magnet rings (125).

Each of the first fixing rings (110) has a first axial face (111) perpendicular to the longitudinal axis of the rotor (200), to which the first permanent magnet ring (115) will be fixed, whereby each first fixing ring (110) is also concentric to the axis (210) of the rotor (200) and fixed equally thereto by means of fixing elements, therefore being integral with the axis (210) and rotating together therewith at the same angular speed, without slipping. The internal diameter of the first fixing ring (110) must be at least equal to the external diameter of the axis (210) of the rotor (200). The first fixing rings (110) may be fixed to the rotor (200) in an internal and/or external portion of the rotary electric machine. The first fixing ring (110) is manufactured from a material suitable for the application and may be, without limitation, metal and alloys thereof or polymeric material, alone or in combination.

In this embodiment, each of the first permanent magnet rings (115) is essentially parallel to the first axial face (111) and also concentric to the first fixing ring (110) and therefore concentric to the axis (210) of the rotor (200), and fixed onto its first axial face (111) by means of fixing elements, being therefore integral with the first fixing ring (110) and thus also integral with the axis (210), rotating together therewith at the same speed angular, without slipping. Each of the first permanent magnet rings (115) is manufactured from magnetizable material, which may be, without limitation, ferromagnetic metal and alloys thereof, alone or in combination, and may be constructed in a single piece or in segments. The first permanent magnet rings (115), due to being integral with the first fixing rings (110), may also be fixed to an internal and/or external portion of the rotary electric machine.

The second fixing ring (120) has a second axial face (121) perpendicular to the longitudinal axis of the rotor (200) and essentially parallel to the first axial faces (111) of the first fixing rings (110), in which the second permanent magnet rings (125) will be fixed to the second axial face (121), one on each side of the second axial face (121), whereby the second fixing ring (120) is concentric to the axis (210) of the rotor (200) and fixed in an internal and/or external portion of one or more static elements of the rotary electric machine, by means of fixing elements, being therefore integral with the static part of the electric machine and thus immobile. The second fixing ring (120) is manufactured from a material suitable for the application and may be, without limitation, metal and alloys thereof or polymeric material, alone or in combination.

Each of the second permanent magnet rings (125) is essentially parallel to the second axial face (121) and thus also essentially parallel to the first axial face (111), also being concentric to the second fixing ring (120) and therefore to the axis (210) of the rotor (200), and fixed to the second axial face (121) by means of fixing elements, being therefore integral with the second fixing ring (120) and thus also integral with an internal and/or external portion of one or more static elements of the rotary and thus immobile electric machine. Each of the second permanent magnet rings (125) is manufactured from magnetizable material, which may be, without limitation, ferromagnetic metal and alloys thereof, alone or in combination, and may be constructed in a single piece or in segments.

In this embodiment, the fixing rings (110, 120) are mounted so that the second fixing ring (120) is axially centered between the first fixing rings (110).

Thus, the largest or free surface of each first permanent magnet ring (115) is arranged opposite and parallel to the largest or free surface of each second permanent magnet ring (125), whereby the pairs of permanent magnet rings (115, 125), preferably on their larger or free surfaces, should preferably have equal polarities therebetween, always in pairs, so that a magnetic repulsion force of equal poles is established therebetween, taking place in the two chambers (R) resulting from the axial spacings (a). It should be noted that the pairs of permanent magnet rings (115, 125) eventually may also have different polarities therebetween, so that a magnetic attraction force of opposite poles is established therebetween, taking place in the two chambers (R) resulting from the axial spacings (a).

It should be noted that the polarity of each of the first permanent magnet rings (115) must be unique and constant over at least its entire largest or free surface facing, in a parallel manner, to the surface of each of the second permanent magnet rings (125). Likewise, the polarity of the second permanent magnet ring (125), equal (or different, depending on the manufacturer's choice) to the polarity of each of the first permanent magnet rings (115), must be unique and constant over at least its entire surface facing the surface of the corresponding first permanent magnet ring (115). It should be noted that the permanent magnet rings (115, 125) may be one piece or composed of several segments.

Thus, the use of at least two pairs of permanent magnet rings (115, 125) essentially parallel to each other, in the axial direction, and with at least their surfaces having equal polarities (or opposite, depending on the manufacturer's choice), promotes repulsion (attraction) between the permanent magnet rings (115, 125), forcing magnetic alignment therebetween in the axial direction. Axial displacements (d) between the permanent magnet rings (115, 125) generate magnetic forces which absorb thrust and other axial forces from ventilation systems and/or axial loads, forcing the axis (210) to return to an ideal, initial, or preferred axial translational stabilization position, in which the axial displacement (d) is equal to zero or near zero. Any axial displacements (d) caused by axial forces imposed on the rotor (200) then occur around this ideal, initial, or preferred axial translational stabilization position, in which the axial displacement (d) assumes the smallest possible value, ideally being d=0. The parallelism of the at least two pairs of permanent magnet rings (115, 125) may also occur in the radial direction, with other conditions remaining unchanged.

The embodiment of the system (100) of the invention therefore also guarantees the axial alignment of the rotor (200) in relation to the stator (300) and other fixed elements of the electric machine, around the ideal, initial, or preferred axial translational stabilization position, in which the numerical value of the axial displacement (d) is equal to zero or near zero. By comprising first rings (110, 115) and second rings (120, 125) which may form separate and independent modules, provided with permanent magnets instead of coils or windings, the system (100) of the invention may be applied to practically any rotary electric machine, which can be internally or externally installed to the rotary electric machine, in simple (internal or external) or mixed (internal and external) mode on the same electric machine, with more than one set of rings (110, 115, 120, 125) installed on the same rotary electric machine, e.g., as represented in FIGS. 5, 5a, and 5b. Likewise, the same rotary electric machine may have an externally installed set of rings (110, 115, 120, 125) and another internally installed set of rings (110, 115, 120, 125) and/or more than one externally installed set of rings (110, 115, 120, 125) and/or more than one internally installed set of rings (110, 115, 120, 125) or combinations of said alternatives. It is also possible to have one or more sets of rings (110, 115, 120, 125) in neighboring positions and/or in non-neighboring positions of the rotary electric machine, in any position of the axis (210) of the rotor (200).

Furthermore, it should be noted that the use of the term "integral" must be understood broadly and independently of the referenced numbering, and the first rings (110, 115) may be, for example, those integral with a static part of the rotary electric machine, whilst the second rings (120, 125) are the ones which rotate.

Finally, a rotary electric machine according to the invention is an electric motor provided with a system (100) in accordance with the invention.

CONCLUSION

It will be easily understood by one skilled in the art that modifications may be made to the present invention without departing from the concepts set out in the description above. Such modifications should be considered as included within the scope of the present invention. Consequently, the particular embodiments previously described in detail are illustrative and exemplary only and are non-restrictive as to the scope of the present invention, which should be given the full extent of the appended claims and any and all equivalents thereof.

The invention claimed is:

1. An axial alignment system for a rotary electric machine, the axial alignment system comprising:
   a first fixing ring configured to be fixed to a shaft of a rotor of the rotary electric machine;
   a first permanent magnet ring fixed to the first fixing ring;
   a second fixing ring configured to be fixed to a static element of the rotary electric machine; and
   a second permanent magnet ring fixed to the second fixing ring; wherein:
   a surface of the first permanent magnet ring faces a surface of the second permanent magnet ring with an annular chamber therebetween; and
   a polarity of an entirety of said surface of the first permanent magnet ring is opposite a polarity of an entirety of said surface of the second permanent magnet ring, such that a magnetic attraction force is established between said surface of the first permanent magnet ring and said surface of the second permanent magnet ring in the annular chamber.

2. The axial alignment system according to claim 1, wherein the the first fixing ring and the first permanent magnet ring form a first module, and the second fixing ring and the second permanent magnet ring form a second module separate from the first module.

3. A rotary electric machine comprising:
   the rotor, which comprises the shaft;
   the static element;
   a housing; and
   the axial alignment system according to claim 1; wherein:
   the first fixing ring, the first permanent magnet ring, the second fixing ring, and the second permanent magnet ring are located at a position inside the housing.

4. A rotary electric machine comprising:
   the rotor, which comprises the shaft;
   the static element; and
   the axial alignment system according to claim 1; wherein:
   the first fixing ring is integral with the shaft of the rotor; and the second fixing ring is integral with the static element.

5. The axial alignment system according to claim 1, wherein (i) the first fixing ring and the first permanent magnet ring are inside and/or surrounded by the second fixing ring and the second permanent magnet ring, or (ii) the first fixing ring and the first permanent magnet ring are outside and/or surround the second fixing ring and the second permanent magnet ring.

6. A rotary electric machine comprising at least one axial alignment system according to claim 1.

7. A rotary electric machine comprising:
the rotor, which comprises the shaft;
the static element;
a housing; and
the axial alignment system according to claim 1; wherein:
the first fixing ring, the first permanent magnet ring, the second fixing ring, and the second permanent magnet ring are located at a position outside the housing.

8. An axial alignment system for a rotary electric machine, the axial alignment system comprising:
a plurality of first fixing rings, each configured to be fixed to a shaft of a rotor of the rotary electric machine;
a plurality of first permanent magnet rings, each fixed to a respective one of the first fixing rings;
at least one second fixing ring fixed to a static element of the rotary electric machine; and
a plurality of second permanent magnet rings, each fixed to the at least one second fixing ring; wherein:
a surface of each first permanent magnet ring faces a surface of a respective second permanent magnet ring with an annular chamber therebetween; and
a polarity of an entirety of said surface of each first permanent magnet ring is opposite a polarity of an entirety of said surface of each respective second permanent magnet ring, such that a magnetic attraction force is established between each surface of the first permanent magnet ring and each surface of the respective second permanent magnet ring in the respective annular chamber.

9. The axial alignment system according to claim 8, wherein each first fixing ring and each respective first permanent magnet ring form a first module, and each second fixing ring and each respective second permanent magnet ring form a second module separate from the first module.

10. A rotary electric machine comprising:
the rotor, which comprises the shaft;
the static element;
a housing; and
the axial alignment system according to claim 8; wherein:
at least one first set of one of the first fixing rings, one of the first permanent magnet rings, one of the at least one second fixing ring, and one of the second permanent magnet rings is located at a position inside the housing; and
at least one second set of another of the first fixing rings, another of the first permanent magnet rings, another of the at least one second fixing ring, and another of the second permanent magnet rings is located at a position outside the housing.

11. The axial alignment system according to claim 8, wherein each of the first fixing rings has an axial face perpendicular to the longitudinal axis of the rotor, to which the respective first permanent magnet ring is fixed.

12. The axial alignment system according to claim 8, wherein the at least one second fixing ring comprises a single second fixing ring that has two axial faces that are opposite each other, perpendicular to the longitudinal axis of the rotor and essentially parallel to the axial faces of the first fixing rings, wherein each of the second permanent magnet rings is fixed to a respective one of the axial faces of the respective second fixing ring.

13. The axial alignment system according to claim 8, wherein the at least one second fixing ring comprises a single second fixing ring that is axially centered between the first fixing rings.

14. A rotary electric machine comprising at least one axial alignment system according to claim 8.

* * * * *